United States Patent
Biswas et al.

(10) Patent No.: US 10,459,925 B2
(45) Date of Patent: Oct. 29, 2019

(54) COMPUTER-ENABLED METHOD OF ASSISTING TO GENERATE AN INNOVATION

(71) Applicant: Iprova Sarl, Lausanne (CH)

(72) Inventors: Debmalya Biswas, Lausanne (CH); Julian C. Nolan, Pully (CH); Matthew J. Lawrenson, Bussigny (CH)

(73) Assignee: IPROVA SARL, Lausanne (CH)

( * ) Notice: Subject to any disclaimer, the term of this patent is extended or adjusted under 35 U.S.C. 154(b) by 933 days.

(21) Appl. No.: 14/563,339

(22) Filed: Dec. 8, 2014

(65) Prior Publication Data

US 2016/0162486 A1 Jun. 9, 2016

(51) Int. Cl.
- *G06F 17/30* (2006.01)
- *G06F 7/00* (2006.01)
- *G06F 16/2457* (2019.01)
- *G06F 16/35* (2019.01)

(52) U.S. Cl.
CPC ........ *G06F 16/24578* (2019.01); *G06F 16/35* (2019.01)

(58) Field of Classification Search
CPC ....................... G06F 17/3053; G06F 17/30705
USPC .......................................................... 707/729
See application file for complete search history.

(56) References Cited

U.S. PATENT DOCUMENTS

| | | | |
|---|---|---|---|
| 5,371,673 A * | 12/1994 | Fan | G06Q 30/02 704/1 |
| 5,390,282 A | 2/1995 | Koza et al. | |
| 5,581,663 A | 12/1996 | Zlotin et al. | |
| 6,056,428 A | 5/2000 | Devoino et al. | |
| 6,167,370 A | 12/2000 | Tsourikov et al. | |
| 6,202,043 B1 | 3/2001 | Devoino et al. | |
| 6,360,191 B1 | 3/2002 | Koza et al. | |
| 7,451,120 B1 * | 11/2008 | Kumar | G06F 17/30675 706/12 |
| 7,533,035 B1 | 5/2009 | Abend et al. | |

(Continued)

FOREIGN PATENT DOCUMENTS

| WO | WO/2005/060684 | 7/2005 |
| WO | WO/2007/081519 | 7/2007 |

OTHER PUBLICATIONS

"Introduction to Information Retrieval", Manning, C. D., Raghavan, P., Schütze, H., Cambridge University Press. 2008, 581 pages.

(Continued)

*Primary Examiner* — Pavan Mamillapalli
(74) *Attorney, Agent, or Firm* — KED & Associates, LLP

(57) ABSTRACT

According to the present invention there is provided a computer-enabled method of assisting to generate an innovation, the method comprising the steps of: retrieving from a database a first set of more than two documents belonging to a first domain ($D_1$); retrieving from said database a second set of more than two documents belonging to a second domain ($D_2$); selecting all possible combinations of documents from the first set with all documents in said second set, and for each combination of documents: determining a composite novelty score, a composite proximity score and a composite impact score; and based on all of the determined composite novelty scores and/or composite proximity scores and/or composite impact scores, providing a recommendation which can assist to generate an innovation.

17 Claims, 8 Drawing Sheets

(56) References Cited

U.S. PATENT DOCUMENTS

| | | | |
|---|---|---|---|
| 7,685,118 B2 | 3/2010 | Zhang | |
| 2001/0034629 A1 | 10/2001 | Cronin | |
| 2004/0030414 A1 | 2/2004 | Koza et al. | |
| 2004/0054520 A1* | 3/2004 | Dehlinger | G06F 16/35 704/5 |
| 2004/0078192 A1 | 4/2004 | Poltorak | |
| 2006/0005247 A1* | 1/2006 | Zhang | G06F 21/6245 726/26 |
| 2006/0036560 A1 | 2/2006 | Fogel | |
| 2006/0036596 A1* | 2/2006 | Zhang | G06F 16/35 707/999.005 |
| 2007/0112746 A1 | 5/2007 | Todhunter | |
| 2008/1019560 | 8/2008 | Sears | |
| 2009/0132522 A1* | 5/2009 | Leino | G06F 16/9027 707/999.005 |
| 2009/0144617 A1* | 6/2009 | Funes | G06F 16/358 715/256 |
| 2010/0179817 A1* | 7/2010 | Wold | G06Q 10/10 705/1.1 |
| 2011/0295903 A1* | 12/2011 | Chen | G06F 16/367 707/794 |
| 2013/0086470 A1* | 4/2013 | Dorr | G06F 17/2735 715/256 |
| 2014/0032358 A1* | 1/2014 | Perkowitz | H04W 4/21 705/26.7 |
| 2015/0178272 A1* | 6/2015 | Geigel | G06F 16/35 704/9 |

OTHER PUBLICATIONS

Toutanova, K., Klein, D., Manning, C., Singer, Y.: Feature-Rich Part-of-Speech Tagging with a Cyclic Dependency Network. In: Conference of the North American Chapter of the Associat for Computational Linguistics on Human Language Technology, vol. 1, pp. 252-259 (2003).

Koza et al.; "Automated Re-Invention of Six Patented Optical Lens Systems Using Genetic Programming"; Proceedings 2005 Conference on Genetic and Evolutionary Computation; pp. 1953-1960.

* cited by examiner

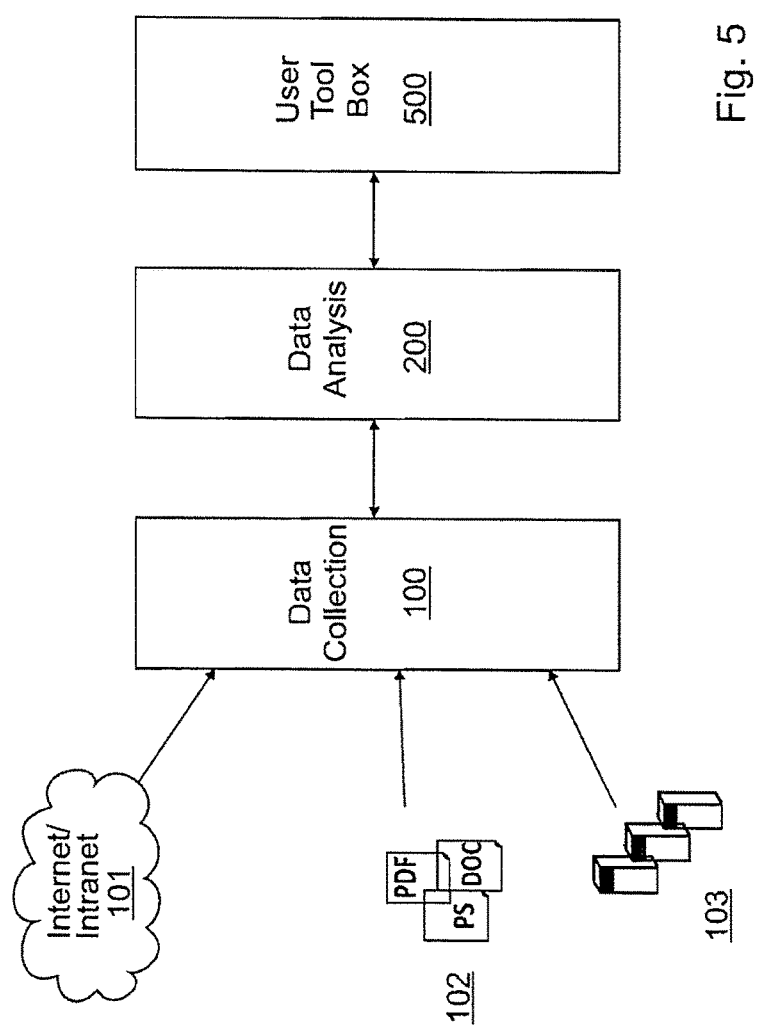

COMPUTER-ENABLED METHOD OF ASSISTING TO GENERATE AN INNOVATION

FIELD OF THE INVENTION

The present invention relates to a computer-enabled method of assisting to generate an innovation by analysing documents to determine if the solutions disclosed in those documents could be integrated into a known solution, and/or to identify another document which discloses another solution which could be integrated into a solution disclosed in a document under analysis, and/or to identify another domain in which there is a high likelihood of finding a document which discloses a solution which could facilitate the merging of the solutions disclosed in documents under analysis or which could facilitate the integration of those solutions into a new solution.

DESCRIPTION OF RELATED ART

The way in which commercially valuable ideas are generated within organizations has remained largely untouched by the general trend towards improved efficiency through automation. Innovative thinking has traditionally been a very manual process, sometimes stimulated through the application of psychological techniques, such as brainstorming. These techniques bring limited improvement, as they are limited to the pre-existing knowledge of the individuals involved and frequently lack any formal structure. Most inventions are created as part of research and development which is carried out in order to solve a predefined problem. The work undertaken as part of this research and development is time consuming and costly.

Another approach to generate innovative ideas is the use of a problem analysis tools and methodologies, some of which are enabled by computer-based technologies that can be applied by a researcher or designer.

Problem analysis tools and methodologies can help a user identify a complex system and identify discrete problems which should be addressed. Here computer systems assist in the application of methods of problem analysis. These include root cause analysis, TRIZ (a Russian acronym for "TeoriyaResheniyaIzobretatelskikhZadatch"), value engineering, system functional analysis, and system benchmarking. TRIZ is a methodology, tool set, knowledge base, and model-based technology for generating innovative ideas and solutions for problem solving. An example of such a tool, called TechOptimizer™, is a computer system marketed by Invention Machine Corporation of Boston, Mass. The technology used in TechOptimizer™ to assist in problem analysis is partially described in U.S. Pat. Nos. 6,056,428 and 6,202,043.

A key deficiency with problem analysis tools is that while they aid in the identification of specific issues to be addressed, the user of such tools is required to possess a good knowledge about the problem being considered. In US20070112746, "System and Method for Problem Analysis,", there is disclosed a method for providing user specific relevant information to assist in the modelling of problems, wherein the principle aspect of analysis is cause-effect, relationships, and wherein a cause or effect statement is automatically reformulated as a natural language query. The query is submitted to a database, and the results of the query are returned, thereby greatly facilitating the process of identifying related cause-effect data.

An alternative approach is described by U.S. Pat. No. 5,390,282, "A process for problem solving using spontaneously self-replicating and self-improving entities". This invention relates to evolutionary processes useful for problem solving by generating self-replicating and self-improving computer programs.

An approach which is specific to controllers is described by US2004030414, "Method and apparatus for automatic synthesis of controllers". This invention relates to the field of automatic synthesis of complex structures; more particularly, the automatic synthesis of the topology and parameter values for controllers and control systems.

Yet a further approach to automated innovation has been investigated by Hewlett-Packard and others such as Pfizer. This is exemplified by the paper "Automated re-invention of six patented optical lens systems using genetic programming", Proceedings 2005 Conference on Genetic and Evolutionary Computation on pages 1953-1960 which describes how genetic programming was used in an invention machine to automatically synthesize complete designs for six optical lens systems that duplicated the functionality of previously patented lens systems. The automatic synthesis was done "from scratch"—that is, without starting from a pre-existing good design and without pre-specifying the number of lenses, the physical layout of the lenses, the numerical parameters of the lenses, or the non-numerical parameters of the lenses. One of the six genetically evolved lens systems infringed a previously issued patent; three contained many of the essential features of the patents, without infringing; and the others were non-infringing novel designs that duplicated (or improved upon) the performance specifications contained in the patents.

U.S. Pat. No. 6,360,191 describes an automated design process and apparatus for use in designing complex structures, such as circuits, to satisfy prespecified design goals, using genetic operations.

Natural Selection Inc., San Diego, has also used similar technologies based on Darwinian principles of natural evolution and filed patent application US2006036560, "Intelligently interactive profiling system and method".

U.S. Pat. No. 7,685,118 describes a semantic method using an ontology to solve inventor problems. Different possible solutions are ranked based on their generality.

U.S. Pat. No. 6,167,370 describes a piece of software for semantically analysing documents and for creating new concepts and new ideas.

WO2005060684 suggests a semantic approach to Triz. The user needs to express a problem in terms of a natural language query that contains a contradiction and which is submitted to a semantically indexed database.

U.S. Pat. No. 5,581,663 describes another computer-implemented method for solving problems based on the Triz approach. The method starts from a model of the real-world to identify problems and suggest solutions.

US20080195604 describes an automated method for drafting an invention disclosure based on an initial invention concept. The invention involves semantically parsing an initial invention statement, performing an automated prior art search in patent databases to determine patentability issues, and generate an invention disclosure for filing.

US20010034629 describes a method for facilitating the conception of inventions; mainly based on cooperative work among participants, using guidelines etc.

WO07081519 describes another method for generating ideas and selling inventions.

U.S. Pat. No. 7,533,035 describes a method for evaluating innovations based on several factors, and discarding innovations which don't reach a predetermined threshold.

US20040078192 describes a method for automatically performing a semantic analysis of patents and patent claims, and analysing potential infringement.

However, it will be seen that current tools suffer from one or more of the following problems: they need a problem to be defined, require extensive user interaction and training, tend to produce small incremental improvements of low or zero commercial value, are not reactive to the introduction of new technologies and do not work in real-time. As a result users of these systems have to contend with a number of further problems which may include: staff must be trained to use certain methodologies and tools, patenting opportunities may be lost to competitors who identify the innovation opportunity more quickly or the potential invention generated by use of the tools is not novel or has of little or no value.

Moreover, many prior art systems request a lot of human intervention and are not fully automated. When the prior art systems use computers or other processing means, they usually don't use them in an effective way, and require fast processors and/or lot of memory.

An aim of the present invention is thus to develop a new, computer based approach to generate innovation, using computers and semantic methods for detecting as early as possible innovation opportunities which could not be detected without computer.

It is well known that many new inventions are based on the combinations of two or more known solutions. However, this combination in the prior art is usually based on intuition: the inventor needs to predict whether it would be possible to combine two existing solutions, and whether this combination is likely to bring any advantage. There is no systematic way of performing or automating this process. If the invention results from a combination between solutions from different domains with hundredths or thousands documents in each domain, it would be desirable to propose a systematic method of testing each possible combination of documents.

The present invention also aims to use computer and software modules for automatically and efficiently detecting innovation opportunities, based on automatically, continuously performed analysis of solutions disclosed in documents to indentify suitable solutions which can be combined to form a new solution.

It is also an aim of the present invention to provide an automatic means to assist in the generation of innovation based on solutions which are disclosed in published documents.

BRIEF SUMMARY OF THE INVENTION

According to the invention, these aims are achieved by means of a computer-enabled method of assisting to generate an innovation, the method comprising the steps of: retrieving from a database a first set of more than two documents belonging to a first domain ($D_1$); retrieving from said database a second set of more than two documents belonging to a second domain ($D_2$); selecting all possible combinations of documents from the first set with all documents in said second set, and for each combination of documents: determining a composite novelty score for said documents, wherein the composite novelty score is a score representing likelihood that a merging of the solutions in said two or more documents will provide a novel solution; determining a composite proximity score for said documents, wherein the composite proximity score is a score representing the proximity of each of said documents to one or more predefined ontologies; determining a composite impact score for said documents, wherein the composite impact score is a score representing the feasibility of combining the solutions which are disclosed in said two or more documents; and, based on all of the determined composite novelty scores and/or composite proximity scores and/or composite impact scores which have been determined, providing a recommendation which can assist to generate an innovation.

Preferably the innovation is a new work-flow, new device, new process, new method, or new use.

The method recited in claim 1 is thus based on a new and systematic method for testing combinations of known solutions described in different documents. The invention is based among other on the determination of a composite novelty score, of a composite proximity score, of a composite impact score and of a composite invention score. One advantage of the determination of those scores is that they allow an automatic analysis of solutions disclosed in large collections of documents, the automatic analysis of merging opportunities, and the automatic determination of the impact and novelty of the inventions based on merging of existing solutions.

By taking a new approach to the generation of innovation opportunities, the proposed invention overcomes a number of the problems of the prior art.

In particular, the present invention provides an automated method of determining innovation opportunities, in which human intervention is reduced.

The present invention also provides a computer-enabled method of determining innovation opportunities, in which a more efficient use of computing resources is made. The present invention also provides a computer-enabled method of determining innovation opportunities, with which invention opportunities can be identified which might be difficult to identify with a non-computer-enabled method, other than by chance.

According to one aspect, the determination of a composite novelty score, of a composite proximity score, of a composite impact score and of a composite invention score has the advantage that those score are values which can be computed with a computer. Therefore, the use of those score permits an algorithmic and systematic method for generating new inventions based on the merging of known solutions. Optional features of the computer-enabled method are recited in the dependent claims.

BRIEF DESCRIPTION OF THE DRAWINGS

The invention will be better understood with the aid of the description of an embodiment given by way of example and illustrated by the figures, in which:

FIG. 5 is an illustration of an apparatus showing components or functional modules according to one aspect of the present invention.

DETAILED DESCRIPTION OF POSSIBLE EMBODIMENTS OF THE INVENTION

Figure 1A:
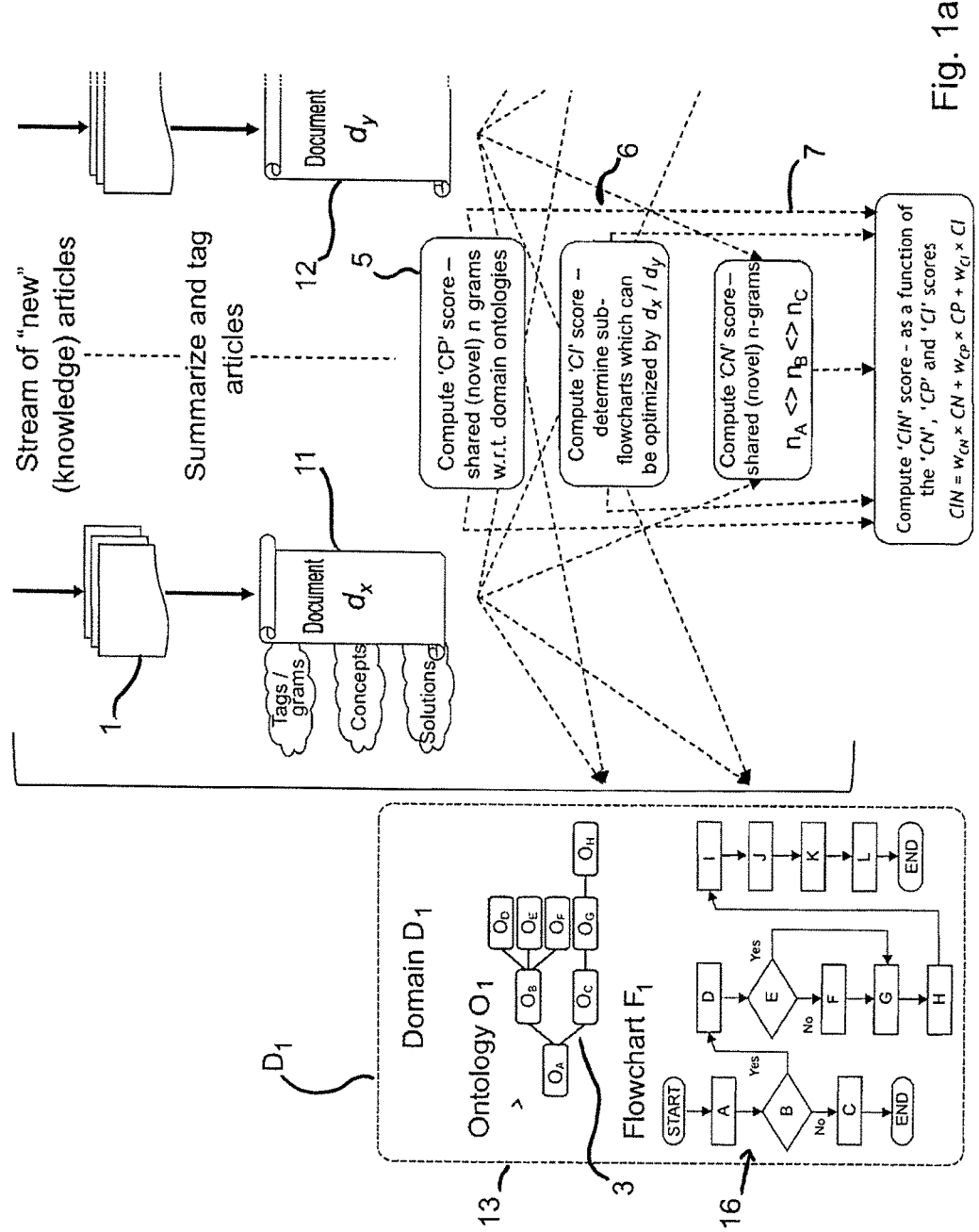
FIGS. 1a and 1b constitute a single figure and provide an illustration of variables used in the computation of the composite novelty, composite proximity and composite impact scores.

An embodiment of the present invention will now be described with respect to two documents ($d_x$, $d_y$), however it should be understood that any number of documents greater than two can be used. Typically a system which implements a method according to the present invention will monitor sources of newly published research, articles, product releases, strategy documents, upcoming technologies and select documents to be used in the present invention from these databases. Monitoring sources can comprise, identifying sources (e.g. websites of interest); and periodically crawling those sources, or monitoring push/notification based systems such as RSS feeds, to gather new publications.

Two documents are selected for analysis ($d_x$, $d_y$). The documents belong to different domains, with document $d_x$ belonging to a first domain $D_1$ and document $d_y$ belonging to a second domain $D_2$. In a preferred embodiment, each of the two documents is automatically retrieved from a larger set of documents in a database, for example a patent or scientific publication database. In one embodiment, each set of documents correspond to the result of a search query in a larger database, so as to retrieve a set of at least two solutions. The selection of the two documents ($d_x$, $d_y$) is then performed automatically by a software selection module which iteratively combines each document from the first set with each document from the second set, so as to try each possible combination between solutions in the first domain and solutions in the second domain. The number of documents in each set could be large, with possibly more than 100 or even more than 1000 document in each of the domains ($D_1$, $D_2$), resulting in an even larger number of combinations of documents to analyse.

For example a data collection module (such as a crawler etc) (e.g. 100, as shown in FIG. 5) may retrieve from a database a first set of more than two documents belonging to a first domain ($D_1$) and retrieve a second set of documents belonging to a second domain ($D_2$); and the method of the present invention will then be performed selecting all possible combinations of documents from the first set with all documents in said second set. In the example described in this description, documents ($d_x$, $d_y$) may be one such combination of documents. The data collection module may be in the form of a Web crawlers which collate "unstructured" data from data sources (e.g. blogs, news sources, real-time social networks, HTML/XML published journals/documents) and Web Searches may be used to collect "structured" data—semantically tagged (optionally, with statistical metadata: time, volume). Crawling frequency may be defined to provide frequent updates, and allow subsequent system function to be provided in real time. Other sources of documents include data sources which may provide dedicated feeds which send data out in real-time using a well-defined structure and format (e.g. RSS). Search engine volume data can also optionally be used. Documents may also be manually entered and edited by users into the data collection module. As previously mentioned any number of documents greater than two can be selected for analysis; it will also be understood that each of the documents may belong to different domains or the same domain.

For each of the domains ($D_1$, $D_2$) which the selected documents belong, an ontology is defined:

A first group of published documents, relating to the first domain $D_1$ are scanned and keywords and/or concepts are selected from this group of published documents to define a first ontology ($O_1$). The ontology can be generated manually; or in an automated fashion by first extracting keywords from the published documents based on for example the frequency of occurrence of words in the documents, followed by a grouping of the keywords into domain specific concepts using ontology learning techniques such as lemmatisation, or part-of-speech tagging (as disclosed in Toutanova, K., Klein, D., Manning, C., Singer, Y.: Feature-Rich Part-of-Speech Tagging with a Cyclic Dependency Network. In: Conference of the North American Chapter of the Association for Computational Linguistics on Human Language Technology, vol. 1, pp. 252-259 (2003), which is incorporated herein by reference, with pre and post-processing techniques. The first ontology ($O_1$) is thus a representation of the first domain $D_1$ in the form of a list of keywords and/or concepts which were disclosed in the first group of published documents. The keywords and/or concepts may be in the form of a hierarchy, or more generally a connected graph; with the links between keywords denoting the relationship between them. The relationship can for example correspond to a super or sub-sumption relationship leading to a hierarchy of keywords and/or concepts "A-B-C" where "A is a subclass of B" and "C is a subclass of B". "Consumer Electronic Devices-TV Set-B&W TV" is an example of such a hierarchy. The links can also denote other types of relationships where a keyword is an attribute, or property, of the connected keyword; or verb relations denoting for example one of the following semantic relationships between the connected keywords: causation, presupposition, temporal inclusion, or troponymy. Other information-retrieval based weighting techniques (as disclosed in Manning, C. D., Raghavan, P., Schutze, H.: Introduction to Information Retrieval, Cambridge University Press. 2008, which is incorporated herein by reference) can for example be used to define a hierarchy with the most important keywords and/or concepts located at the top of the hierarchy and less important keywords and/or concepts located towards the bottom of the hierarchy. The links between the keywords define paths through the first ontology ($O_1$).

A second group of published documents, relating to the second domain $D_2$ are scanned and keywords and/or concepts are selected from this group of published documents to define a second ontology ($O_2$). The ontology can be generated manually; or in an automated fashion by first extracting keywords from the published documents based on for example the frequency of occurrence of words in the documents, followed by a grouping of the keywords into domain specific concepts using ontology learning techniques such as lemmatisation, or part-of-speech tagging, with pre and post-processing techniques. The second ontology ($O_2$) is thus a representation of the second domain $D_2$ in the form of a list of keywords and/or concepts which were disclosed in the second group of published documents. The keywords and/or concepts may be in the form of a hierarchy, or more generally a connected graph; with the links between keywords denoting the relationship between them. The relationship can for example correspond to a super or sub-sumption relationship leading to a hierarchy of keywords and/or concepts "A-B-C" where "A is a subclass of B" and "C is a subclass of B". "Consumer Electronic Devices-TV Set-B&W TV" is an example of such a hierarchy. The links can also denote other types of relationships where a keyword is an attribute, or property, of the connected keyword; or verb relations denoting for example one of the following semantic relationships between the connected keywords: causation, presupposition, temporal inclusion, or troponymy. Other information-retrieval based weighting techniques can for example be used to define a hierarchy with the most important keywords and/or concepts located at the top of the hierarchy and less important keywords and/or concepts located towards the bottom of the hierarchy. The links between the keywords define paths through the second ontology ($O_2$).

Then, for each of the domains ($D_1$, $D_2$) which the selected documents belong one or more flowcharts is/are defined:

For the first domain $D_1$ a single flowchart may be formed by aggregating the processes or workflows which are disclosed in the first group of published documents. Alternatively a plurality of flowcharts may be formed with each flowchart corresponding to the process or workflow disclosed in a respective document in the first group of published documents.

It will be understood that in the present description each process or workflow constitutes a solution to a problem; however it will be understood that the present invention can equally be applied to documents which disclose other subject matter other than processes or workflows, such as devices or compounds for example.

For the second domain $D_2$ a single flowchart may be formed by aggregating the processes or workflows which are disclosed in the second group of published documents. Alternatively a plurality of flowcharts may be formed with each flowchart corresponding to the process or workflow disclosed in a respective document in the second group of published documents.

The one or more flowcharts will typically have a sequence of nodes, each of which is a process step or workflow step; the flowchart may branch into a plurality of paths based on decisions made as part of the process or workflow (e.g. a first path of steps is followed if a condition is positive, and a second alternate path of steps is followed if the condition is negative).

In this example a single flowchart ($F_1$) is formed by aggregating the process steps or workflows steps which are disclosed in the first group of published documents and a second flowchart ($F_2$) is formed by aggregating the process steps or workflow steps which are disclosed in the second group of published documents.

It should be noted that more than one ontology and more than one flowchart can be defined per domain. For simplicity, in this example we will assume that there is one single ontology $O_1$, $O_2$ per domain $D_1$, $D_2$, each in the form of a list of keywords and/or concepts selected from the first and second group of documents respectively, and one single flow chart $F_1$, $F_2$ per domain $D_1$, $D_2$, each of which is an aggregation of the process steps or workflow steps which are disclosed in the first and second group of published documents respectively.

Accordingly ($O_1$, $F_1$) and ($O_2$, $F_2$) refer to the (ontology, flowchart) corresponding to domains $D_1$, and $D_2$, respectively.

Optionally an invention score (IN) may be determined for each of the documents $d_x$, $d_y$; $IN_{D1}(d_x)$ is the invention score for document $d_x$ and $IN_{D2}(d_y)$ is the invention score for document $d_y$. The documents ($d_x$, $d_y$) may be presented to the user in descending order of their 'IN' scores. In order to determine an invention score 'IN' for each document $d_x$, $d_y$ the following steps may be carried out:

A score representative of the novelty ('N') of each document is determined: Document $d_x$ is scanned to identify words and/or terms (e.g. n-grams) disclosed in document $d_x$ which are not disclosed in any of the first group of published documents, or which are disclosed less than a predefined threshold number; the number of identified words and/or terms constitutes the novelty score for document $d_x$. Document $d_y$ is scanned to identify words and/or terms (e.g. n-grams) disclosed in document $d_y$ which are not disclosed in any of the second group of published documents, or which are disclosed less than a predefined threshold number; the number of identified words and/or terms constitutes the novelty score for document $d_y$.

A score representative of the proximity ('P')) of each document is determined; the proximity score is indicative of the 'closeness' of a document to an ontology: The number of words which are mentioned in the list of the first ontology ($O_1$) which are disclosed in document $d_x$ is the proximity score of document $d_x$. The number of words which are mentioned in the list of the second ontology ($O_2$) which are disclosed in document $d_y$ is the proximity score of document $d_y$. In an alternative embodiment one or more of the words listed in the ontologies ($O_1$, $O_2$) may be further weighted according to their frequency of occurrence in the documents ($d_x$, $d_y$).

A score representative of the Impact ('I') of each document is determined: The impact score for document $d_x$ is the number of steps (i.e. number of nodes) in flowchart $F_1$, which can be, replaced, optimized, or improved, by processes/workflows which are described in document $d_x$. The impact score for document $d_y$ is the number of steps (i.e. number of nodes) in flowchart $F_2$, which can be, replaced, optimized, or improved, by processes/workflows which are described in document $d_y$.

It should be understood that in the present invention a process/workflow which is described in a document $d_x$, $d_y$ can replace, optimize, or improve, steps (nodes) in a flowchart $F_1$, $F_2$ if there is a high number (preferably above a predefined threshold number) of the words in the tags (i.e. script illustrated in a node which describes a process/workflow step) of those nodes, match words in the description or tags in the document $d_x$, $d_y$. Tags or parts of the description corresponding to a part of process/workflow, may be extracted from the document $d_x$, $d_y$ and compared to the tags in the flowchart $F_1$, $F_2$ to identify the number of matching tags.

The invention score 'IN' of each document $d_x$, $d_y$ with respect to its respective domain $D_1$, $D_2$, with corresponding ontology $O_1$, $O_2$ and flowchart $F_1$, $F_2$; is computed as a function of the above scores:

$$IN_D(d_x)=w_N \times N(d_x)+w_P \times P(d_x)+w_I \times I(d_x)$$

$$IN_D(d_y)=w_N \times N(d_y)+w_P \times P(d_y)+w_I \times I(d_y)$$

wherein $w_N$, $w_P$ and $w_I$ denote weights assigned to the computed 'N', 'P' and 'I' scores, respectively. The weights can be assigned manually, in accordance with the importance of the scores in finding inventive documents for a specific domain.

The documents ($d_x$, $d_y$) may be presented to the user in descending order of their 'IN' scores. The system may include a user interface which consists of aggregating a stream of such documents, sorting, and presenting them to the user in descending order of their 'IN' scores.

Next a composite novelty score ('CN') for the documents $d_x$ and $d_y$ is computed. The composite novelty score is a measure of the number of additional novel words and/or terms, or groups of adjoining words and/or terms, which a merge of the said two or more documents is likely to contain than any of the said documents individually. To compute the composite novelty score ('CN') the following steps are carried out:

Document $d_x$ is scanned to identify words and/or terms (e.g. n-grams) disclosed in document $d_x$ which are not disclosed in any of the first group of published documents, or which are disclosed less than a predefined threshold number. Document $d_y$ is scanned to identify words and/or terms (e.g. n-grams) disclosed in document $d_y$ which are not disclosed in any of the second group of published documents, or which are disclosed less than a predefined threshold number. $c(d_x)$ denotes the set of words and/or terms identified in document $d_x$ and $c(d_y)$ denotes the set of words and/or terms identified in document $d_y$. The composite novelty score ('CN') is then computed as the number of words and/or terms which are common to both sets $c(d_x)$ and $c(d_y)$:

$$CN(d_x,d_y):=|c(d_x) \cap c(d_y)|$$

As previously mentioned the present invention can be applied to any number of documents and is not limited to using two documents ($d_x$, $d_y$). The general formula to compute the composite novelty score for 'n' documents ($d_1$, $d_2$, ..., $d_n$) is:

$$CN(d_1,d_2,\ldots,d_n):=|c(d_1) \cap c(d_2) \cap \ldots \cap c(d_n)|$$

wherein $c(d_1)$ denotes the set of words and/or terms identified in document $d_1$; $c(d_2)$ denotes the set of words and/or terms identified in document $d_2$; $c(d_n)$ denotes the set of words and/or terms identified in the 'n'th document $d_n$; $|c(d_1) \cap c(d_2) \cap \ldots \cap c(d_n)|$ denotes the number of words and/or terms which are common among the sets $c(d_1)$, $c(d_2)$, ..., $c(d_n)$.

Next a composite proximity score ('CP') is computed. The composite proximity score is a score representing the 'closeness' of documents $d_x$ and $d_y$ to each of the ontologies $O_1$ and $O_2$. In order to calculate the composite proximity score the following steps are carried out:

The set of words which are mentioned in the list of the first ontology ($O_1$) which are disclosed in document $d_x$ is determined $P_{O1}(d_x)$. The set of words which are mentioned in the list of the first ontology ($O_1$) which are disclosed in document $d_y$ is determined $P_{O1}(d_y)$. The set of words which are mentioned in the list of the second ontology ($O_2$) which are disclosed in document $d_y$ is determined $P_{O2}(d_y)$. The set of words which are mentioned in the list of the second ontology ($O_2$) which are disclosed in document $d_x$ is determined $P_{O2}(d_x)$.

Document $d_x$ may contain some of the words mentioned in the list of the second ontology $O_2$, but $d_y$ may not contain any words mentioned in the list of the first ontology $O_1$, i.e. $|P_{O2}(d_x)| \neq 0$ and $|P_{O1}(d_y)|=0$. This implies that a composite document merging $d_x$ and $d_y$ will be 'closer' to the second ontology $O_2$ than to the first ontology $O_1$.

Document $d_y$ may contain some of the words mentioned in the list of the first ontology $O_1$, but $d_x$ may not contain any words mentioned in the list of the second ontology $O_2$ i.e. $|P_{O1}(d_y)| \neq 0$ and $|P_{O2}(d_x)|=0$. This implies that a composite document merging $d_x$ and $d_y$ will be 'closer' to the first ontology $O_1$ than the second ontology $O_2$.

Document $d_y$ may contain some of the words mentioned in the list of the first ontology $O_1$, and $d_x$ may contain some of the words mentioned in the list of the second ontology $O_2$ i.e. $|P_{O1}(d_y)| \neq 0$ and $|P_{O2}(d_x)| \neq 0$. This leads to the highest composite proximity score, and implies that there is a high likelihood that combining the processes/workflows disclosed in documents $d_x$ and $d_y$ together will provide a new solution.

Finally, document $d_y$ may not contain any words mentioned in the list of the first ontology $O_1$, and $d_x$ may not contain any words mentioned in the list of the second ontology $O_2$ i.e. $|P_{O1}(d_y)|=|P_{O2}(d_x)|=0$. This leads to the lowest composite proximity score, and implies that merging the processes/workflows disclosed in documents $d_x$ and $d_y$ together will not provide a new solution.

The composite proximity score is a score representing the 'closeness' of documents $d_x$ and $d_y$ to each of the ontologies $O_1$ and $O_2$ is then computed as:

$$CP_{O1,O2}(d_x,d_y):=|P_{O2}(d_x)|+|P_{O2}(d_x)|+P_{O1}(d_y)|+|P_{O2}(d_y)|$$

As previously mentioned the present invention can be applied to any number of documents and is not limited to using two documents ($d_x$, $d_y$), or two ontologies ($O_1$, $O_2$). The general formula to compute the composite impact score for 'n' documents ($d_1$, $d_2$, ..., $d_n$) is $$CP_{O1,O2,\ldots,On}(d_1,d_2,\ldots,d_n):=|P_{O1}(d_1)|+|P_{O1}(d_2)|+\ldots+|P_{O1}(d_n)|)+(|P_{O2}(d_1)|+|P_{O2}(d_2)|+\ldots+|P_{O2}(d_n)|+\ldots+(|P_{On}(d_1)|+|P_{On}(d_2)|+\ldots+|P_{On}(d_n)|)$$

wherein the number of words which are mentioned in the list of the first ontology $O_1$ which are disclosed in document $d_1$ is denoted $|P_{O1}(d_1)|$; the number of words which are mentioned in the list of the first ontology $O_1$ which are disclosed in document $d_2$ is denoted $|P_{O1}(d_2)|$; the number of words which are mentioned in the list of the first ontology $O_1$ which are disclosed in the 'n'th document $d_n$ is denoted $|P_{O1}(d_n)|$; the number of words which are mentioned in the list of the second ontology $O_2$ which are disclosed in document $d_1$ is denoted $|P_{O2}(d_1)|$; the number of words which are mentioned in the list of the second ontology $O_2$ which are disclosed in document $d_2$ is denoted $|P_{O2}(d_2)|$; the number of words which are mentioned in the list of the first ontology $O_2$ which are disclosed in the 'n'th document $d_n$, is denoted $|P_{O2}(d_n)|$; the number of words which are mentioned in the list of the 'n'th ontology $O_n$ which are disclosed in the first document $d_1$ is denoted $|P_{On}(d_1)|$; the number of words which are mentioned in the list of the 'n'th ontology $O_n$ which are disclosed in the second document $d_2$ is denoted $|P_{On}(d_2)|$; the number of words which are mentioned in the list of the 'n'th ontology $O_n$ which are disclosed in the 'n'th document $d_n$ is denoted $|P_{On}(d_n)|$.

In an alternative embodiment a further step of assigning weights ($w_1$, $w_2$, ..., $w_n$) to each ontology ($O_1$, $O_2$, ..., $O_n$). In this alternative embodiment the composite proximity score is then computed as:

$$CP_{O1,O2,\ldots,On}(d_1,d_2,\ldots,d_n):=w_1 \times (|P_{O1}(d_1)|+|P_{O1}(d_2)|+\ldots+|P_{O1}(d_n)|)+w_2 \times (|P_{O2}(d_1)|+|P_{O2}(d_2)|+\ldots+|P_{O2}(d_n)|+\ldots+w_n \times (|P_{On}(d_1)|+|P_{On}(d_2)|+\ldots+|P_{On}(d_n)|)$$

In a further alternative embodiment a further step of assigning weights ($w_1, w_2, \ldots, w_n$) to each document ($d_1, d_2, \ldots, d_n$), according to the importance of each document ($d_1, d_2, \ldots, d_n$). In this further alternative embodiment the composite proximity score is then computed as:

$$CP_{O1,O2,\ldots,On}(d_1,d_2,\ldots,d_n) := w_1 \times (|P_{O1}(d_1)| + |P_{O2}(d_1)| + \ldots + |P_{On}(d_1)|) + w_2 \times (|P_{O1}(d_2)| + |P_{O2}(d_2)| + \ldots + |P_{On}(d_2)| + \ldots + w_n \times (|P_{O1}(d_n)| + |P_{O2}(d_n)| + \ldots + |P_{On}(d_n)|)$$

Next a composite impact score ('CI')) is determined. The composite impact score is a measure of the feasibility of combining the processes/workflows which are disclosed in documents $d_x$ and $d_y$ to form a single new integrated process/workflow.

Consider the single flowchart $F_1$ which was formed by aggregating the process steps or workflow steps which are disclosed in the first group of published documents and the second flowchart $F_2$ is formed by aggregating the process steps or workflows steps which are disclosed in the second group of published documents. These flowcharts ($F_1$, $F_2$) may include one or more steps (i.e. one or more nodes) which can be replaced, optimized, or improved, by processes/workflows which are described in documents ($d_x$, $d_y$). A process/workflow which is described in document $d_x$, $d_y$ can replace, optimize, or improve, steps (nodes) in a flowchart $F_1$, $F_2$ if there is a high number (preferably above a predefined threshold number) of the words in the tags (i.e. script illustrated in a node which describes a process/workflow step) of those nodes, match words in the description or tags in the document $d_x$, $d_y$. Tags or parts of the description corresponding to a part of process/workflow, may be extracted from the document $d_x$, $d_y$, and compared to the tags in the flowchart $F_1$, $F_2$ to identify the number of matching tags. These one or more steps (i.e. one or more nodes) which can be replaced, optimized, or improved, by processes/workflows which are described in documents ($d_x$, $d_y$) define sub-flowcharts $F_{1x}$, $F_{1y}$, $F_{2x}$, $F_{2y}$; wherein $F_{1X}$ is a sub-flowchart of flowchart $F_1$ which can be replaced, optimized, or improved, by processes/workflows which are described in document $d_x$; $F_{1y}$ is a sub-flowchart of flowchart $F_1$ which can be replaced, optimized, or improved, by processes/workflows which are described in document $d_y$; $F_{2x}$ is a sub-flowchart of flowchart $F_2$ which can be replaced, optimized, or improved, by processes/workflows which are described in document $d_x$; and $F_{2y}$ is a sub-flowchart of flowchart $F_2$ which can be replaced, optimized, or improved, by processes/workflows which are described in document $d_y$.

The composite impact score is computed as follows:

$$CI_{F1,F2}(d_x, d_y) = \max\left(\frac{|F_{1x}| + |F_{1y}| - |F_{1x} \cap F_{1y}|}{|F_1|}, \frac{|F_{2x}| + |F_{2y}| - |F_{2x} \cap F_{2y}|}{|F_2|}\right)$$

wherein $|F_{1x}|$ is the number of steps (i.e. number of nodes) in flowchart $F_1$, which can be, optimized, or improved, by processes/workflows which are described in document $d_x$; $|F_{1y}|$ is the number of steps (i.e. number of nodes) in flowchart $F_1$, which can be, optimized, or improved, by processes/workflows which are described in document $d_y$; $|F_{2x}|$ is the number of steps (i.e. number of nodes) in flowchart $F_2$, which can be, optimized, or improved, by processes/workflows which are described in document $d_x$; $|F_{2y}|$ is the number of steps (i.e. number of nodes) in flowchart $F_2$, which can be, optimized, or improved, by processes/workflows which are described in document $d_y$; $|F_{1x} \cap F_{1y}|$ is the number of steps (i.e. number of nodes) in flowchart $F_1$, which can be, optimized, or improved, by processes/workflows which are described in both documents $d_x$ and $d_y$; $|F_{2x} \cap F_{2y}|$ is the number of steps (i.e. number of nodes) in flowchart $F_2$ which can be, optimized, or improved, by processes/workflows which are described in both documents $d_x$ and $d_y$; $|F_1|$ is the number of steps (i.e. nodes) in flowchart $F_1$ and $|F_2|$ is the number of steps (i.e. nodes) in flowchart $F_2$.

It is noted that in case that there are no steps (i.e. nodes) in flowchart $F_1$ which can be, optimized, or improved, by processes/workflows which are described in $d_y$ then $|F_{1y}|$ will be zero. Likewise, in case that there are no steps (i.e. nodes) in flowchart $F_2$ which can be, optimized, or improved, by processes/workflows which are described in $d_x$ then $|F_{2y}|$ will be zero.

It is also possible that $F_{1x}$ is a sub-flowchart of $F_{1y}$ (or $F_{2x}$ is a sub-flowchart of $F_{2y}$), or vice-versa. The scenario where $F_{1x}=F_{1y}$ ($F_{2x}=F_{2y}$) implies that both $F_{1X}$ and $F_{1y}$ ($F_{2x}$ and $F_{2y}$) are alternatives to the same problem—affecting the same nodes in $F_1$ ($F_2$). This basically implies that documents $d_x$ and $d_y$ can be considered independently—leading to a low 'CI' score.

As previously mentioned the present invention can be applied to any number of documents and is not limited to using two documents ($d_x$, $d_y$), or two flowcharts ($F_1$, $F_2$). The general formula to compute the composite impact score for 'n' documents ($d_1, d_2, \ldots, d_n$) is $$CI_{F1,F2,\ldots,Fn}(d_1, d_2, \ldots, d_n) = \max\left(\frac{|F_{11}| + |F_{12}| + \ldots + |F_{1n}| - |F_{11} \cap F_{12} \cap \ldots \cap F_{1n}|}{|F_1|}, \frac{|F_{21}| + |F_{22}| + \ldots + |F_{2n}| - |F_{21} \cap F_{22} \cap \ldots \cap F_{2n}|}{|F_2|}, \ldots, \frac{|F_{n1}| + |F_{n2}| + \ldots + |F_{nn}| - |F_{n1} \cap F_{n2} \cap \ldots \cap F_{nn}|}{|F_n|}\right)$$

wherein $|F_{11}|$ is the number of steps (i.e. number of nodes) in flowchart $F_1$, which can be, optimized, or improved, by processes/workflows which are described in document $d_1$; $|F_{12}|$ is the number of steps (i.e. number of nodes) in flowchart $F_1$, which can be, optimized, or improved, by processes/workflows which are described in document $d_2$; $|F_{1n}|$ is the number of steps (i.e. number of nodes) in flowchart $F_1$, which can be, optimized, or improved, by processes/workflows which are described in the 'n'th document $d_n$; $|F_{21}|$ is the number of steps (i.e. number of nodes) in flowchart $F_2$, which can be, optimized, or improved, by processes/workflows which are described in document $d_1$; $|F_{22}|$ is the number of steps (i.e. number of nodes) in flowchart $F_2$, which can be, optimized, or improved, by processes/workflows which are described in document $d_2$; $|F_{2n}|$ is the number of steps (i.e. number of nodes) in flowchart $F_2$, which can be, optimized, or improved, by processes/workflows which are described in the 'n'th document $d_n$; $|F_{n1}|$ is the number of steps (i.e. number of nodes) in the 'n'th flowchart $F_n$, which can be, optimized, or improved, by processes/workflows which are described in document $d_1$; $|F_{n2}|$ is the number of steps (i.e. number of nodes) in the 'n'th flowchart $F_n$, which can be, optimized, or improved, by processes/workflows which are described in document $d_2$; $|F_{nn}|$ is the number of steps (i.e. number of nodes) in the 'n'th flowchart $F_n$, which can be, optimized, or improved, by processes/workflows which are described in the 'n'th document $d_n$; $|F_{11} \cap F_{12} \cap \ldots \cap F_{1n}|$ is the number of overlapping steps (i.e. number of nodes) in flowchart $F_1$, which can be, optimized, or improved, by processes/workflows which are described in documents $(d_1, d_2, \ldots, d_n)$; $|F_{21} \cap F_{22} \cap \ldots \cap F_{2n}|$ is the number of overlapping steps (i.e. number of nodes) in flowchart $F_2$, which can be, optimized, or improved, by processes/workflows which are described in documents $(d_1, d_2, \ldots, d_n)$; $|F_{n1} \cap F_{n2} \cap \ldots \cap F_{nn}|$ is the number of overlapping steps (i.e. number of nodes) in the 'n'th flowchart $F_n$, which can be, optimized, or improved, by processes/workflows which are described in documents $(d_1, d_2, \ldots, d_n)$; $|F_1|$ is the number of steps (i.e. nodes) in flowchart $F_1$; $|F_2|$ is the number of steps (i.e. nodes) in flowchart $F_2$; $|F_n|$ is the number of steps (i.e. nodes) in the 'n'th flowchart $F_n$.

Figure 1B:
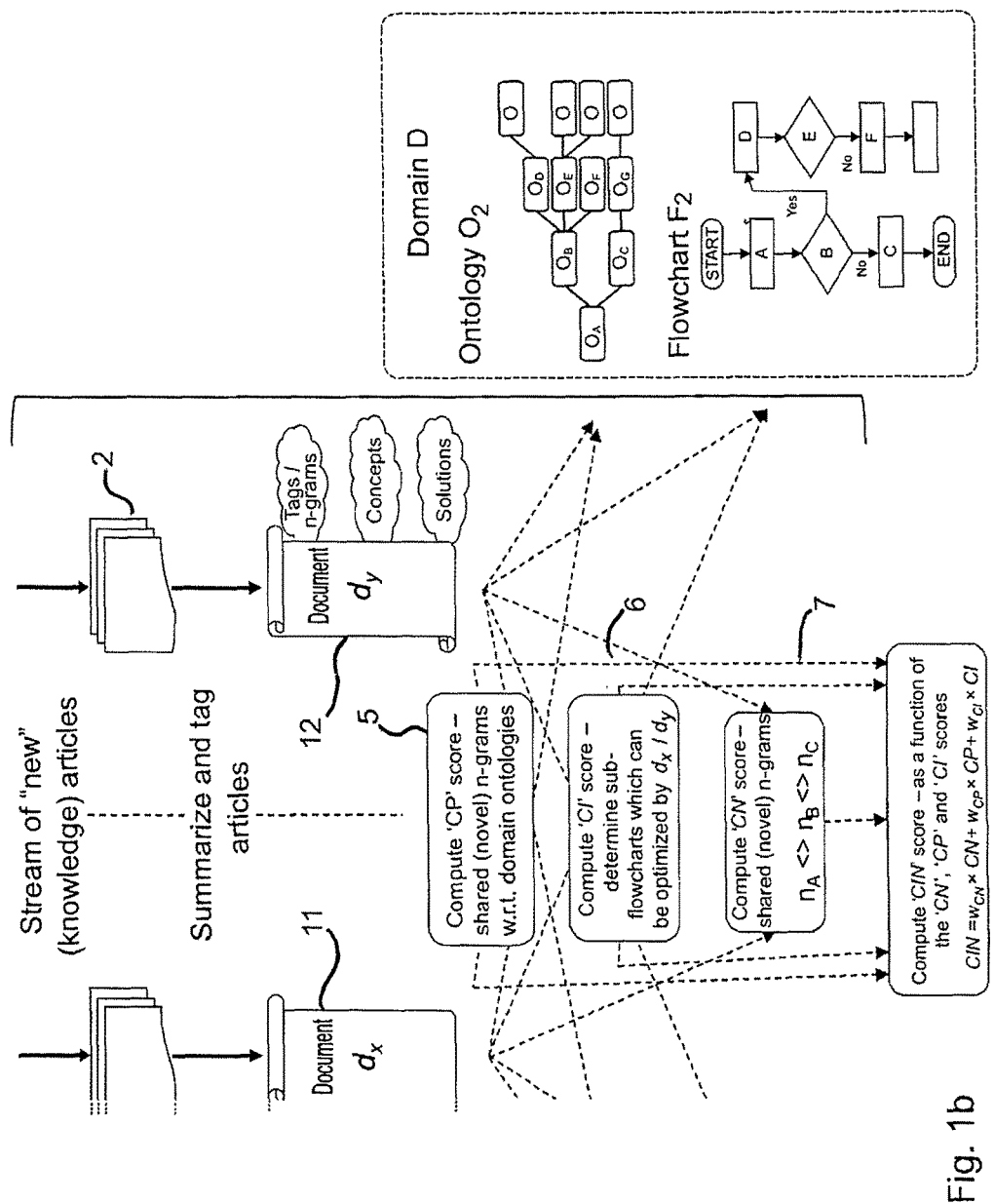

FIGS. 1a and 1b give an overview of the steps carried out in the composite scores computation process. It should be known that FIGS. 1a and 1b together constitute a single figure, and some of the features shown in FIG. 1a are shown again in FIG. 1b. FIGS. 1a and 1b show the first and second groups of published documents 1,2; and documents $d_x$ and $d_y$ 11,12 which disclose tags (process steps/workflow steps), n-grams which are words and/or terms disclosed in document $d_x$ which are not disclosed in any of the first group of published documents 1 and words and/or terms disclosed in document $d_y$ which are not disclosed in any of the second group of published documents 2, and concepts and solutions. Domains $D_1$ and $D_2$ are also shown. A first ontology $O_1$ 13 in the first domain $D_1$ is shown to comprise keywords $O_A$-$O_H$ which are linked by links 3 to define paths though the first ontology $O_1$. The second ontology $O_2$ 14 in the second domain $D_2$ is shown to comprise keywords $O_A$-$O_H$ which are linked by links 3 to define paths though the second ontology $O_2$. A single flowchart ($F_1$) 16 which was formed by aggregating the process steps or workflow steps which are disclosed in a first group of published documents in the first domain $D_1$ is provided. A single flowchart ($F_2$) 17 which was formed by aggregating the process steps or workflows steps which are disclosed in the second group of published documents in the second domain $D_2$ is provided. The composite proximity score (CP) 5 is shown to be calculated using each ontology $O_1$, $O_2$ in the manner described above. The composite impact score ('CI') 6 is shown to be determined using the flowcharts $F_1$ and $F_2$ in the manner described above. In this example the flowchart $F_1$ has steps A-L and flowchart $F_2$ has steps A-F. The composite novelty score ('CN') 7 is computed based on the number of words and/or terms disclosed in documents $d_x$ and $d_y$ respectively which are not disclosed in any of the first group of published documents 1 and second group of published documents 2 respectively.

Once the composite scores ('CN', 'CP', 'CI') have been computed, the system uses those scores to provide a recommendation which will assist to develop a new process/solution. In embodiments of the present invention the system can provide three different recommendations. A first possible recommendation is to merge the processes/workflows which are described in documents $d_x$ and $d_y$; a second possible recommendation is the recommendation of a third document, or list of documents, which is likely to disclose a process/workflow which could be used to merge the processes/workflows which are described in documents $d_x$ and $d_y$; a third possible recommendation is the recommendation of another domain in which there is a high likelihood of finding a document which discloses a process/workflow which could be used to merge the processes/workflows which are described in documents $d_x$ and $d_y$.

Typically the system will make the recommendation to merge the processes/workflows which are described in documents $d_x$ and $d_y$ when the composite impact score ('CI') is high score. Preferably the system will make the recommendation to merge the processes/workflows which are described in documents $d_x$ and $d_y$ when the composite impact score ('CI') is determined to be above a predefined threshold CI score. The recommendation is typically in the form of a solution template $S_{xy}$ in which the processes/workflows which are described in documents $d_x$ and $d_y$ are merged to provide a new process/workflow. If it is determined that the composite impact score ('CI') is above a predefined threshold score then the system proceeds to determine if:

$$\frac{|F_{1x}| + |F_{1y}| - |F_{1x} \cap F_{1y}|}{|F_1|} > \frac{|F_{2x}| + |F_{2y}| - |F_{2x} \cap F_{2y}|}{|F_2|}$$

or if, $$\frac{|F_{2x}| + |F_{2y}| - |F_{2x} \cap F_{2y}|}{|F_2|} > \frac{|F_{1x}| + |F_{1y}| - |F_{1x} \cap F_{1y}|}{|F_1|}$$

Figure 2:
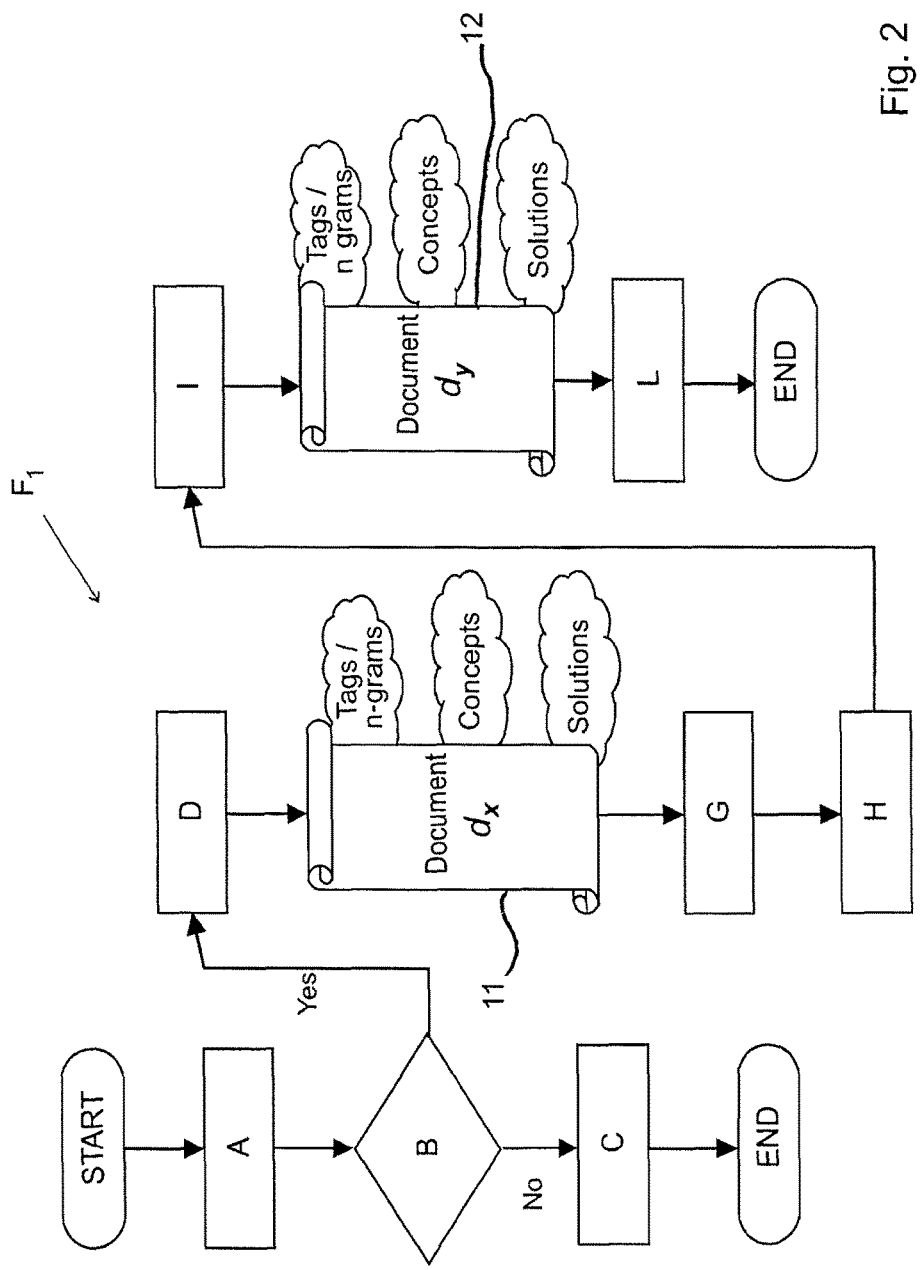
FIG. 2 shows a flowchart which represents known processes/workflows in a domain, in which steps (nodes) have been replaced by the processes/workflows disclosed in two documents ($d_x$, $d_y$) under analysis.

If it is determined that $$\frac{|F_{1x}| + |F_{1y}| - |F_{1x} \cap F_{1y}|}{|F_1|} > \frac{|F_{2x}| + |F_{2y}| - |F_{2x} \cap F_{2y}|}{|F_2|}$$

the system will replace the sub-flowcharts $F_{1x}$ and $F_{1y}$ in $F_1$ with the processes/workflows described in $d_x$ and $d_y$ respectively to generate the solution template $S_{xy}$. FIG. 2 illustrates the flowchart $F_1$ in which the steps E-F (referred to hereafter as sub-flowchart $F_{1k}$) of the flowchart $F_1$ have been replaced by the processes/workflows described in $d_x$ and steps J-K (referred to hereafter as sub-flowchart $F_{1y}$) of the flowchart $F_1$ have been replaced by the processes/workflows described in $d_y$. After the replacement has been complete, the system will recommend the resulting solution template $S_{xy}$ as being an innovative process/workflow.

Similarly if it is determined that $$\frac{|F_{2x}| + |F_{2y}| - |F_{2x} \cap F_{2y}|}{|F_2|} > \frac{|F_{1x}| + |F_{1y}| - |F_{1x} \cap F_{1y}|}{|F_1|}$$

the system will replace the sub-flowcharts $F_{2x}$ and $F_{2y}$ in $F_2$ with the processes/workflows described in $d_x$ and $d_y$ respectively to generate the solution template $S_{xy}$. Then the system will recommend the solution template $S_{xy}$ as being an innovative process/workflow.

In this embodiment the system can identify, and subsequently recommend, a third document ($d_z$), or list of documents, which is likely to disclose a process/workflow which could be used to merge the processes/workflows which are described in documents $d_x$ and $d_y$, using two different techniques. It will be understood that other techniques may also be used.

In a first technique the system will identify the words the and/or terms which are common to both sets $c(d_x)$ and $c(d_y)$ (i.e. $c(d_x) \cap c(d_y)$); the system will then identify, from one or more databases of documents, a third document ($d_z$) or group documents which also discloses these words and/or terms ($c(d_x) \cap c(d_y)$), or which discloses a percentage of these words and/or terms ($c(d_x) \cap c(d_y)$) above a predefined threshold percentage, or in which the occurrence of these words and/or terms ($c(d_x) \cap c(d_y)$) is above a predefined threshold.

A generalization of the process consists of the scenario where the search for (multiple) insights—proceeds in an incremental fashion—with first set of documents providing pointers towards identifying the $2^{nd}$ set of documents (for insight integration), and so on.

Figure 3A:
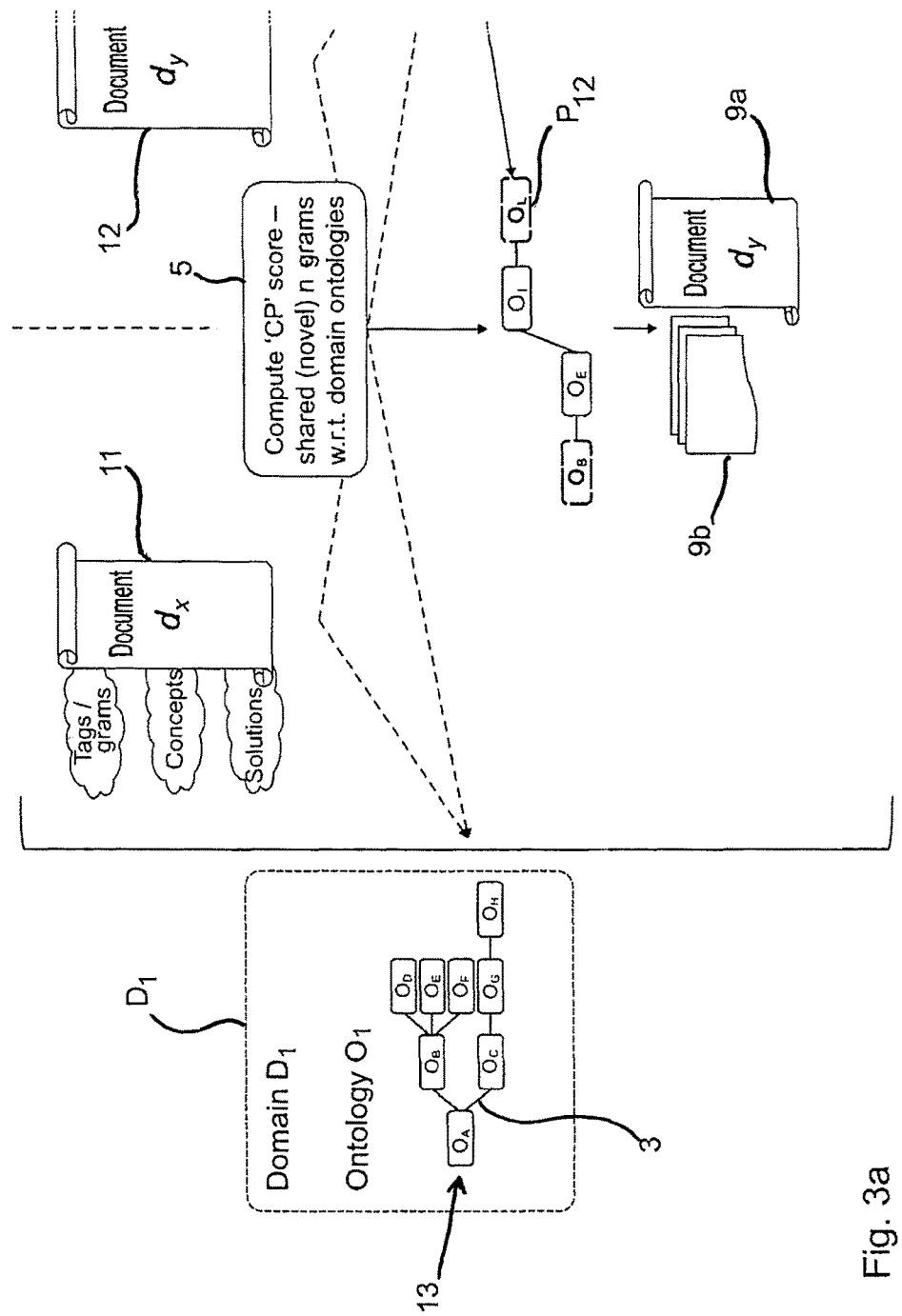
FIGS. 3a and 3b constitute a single figure which provides an illustration of variables used to identify a document ($d_z$), or list of documents, to recommend as being likely to disclose a process/workflow which could be integrated in the process/workflow disclosed in at least one of two documents ($d_x/d_y$) under analysis.
Figure 3B:
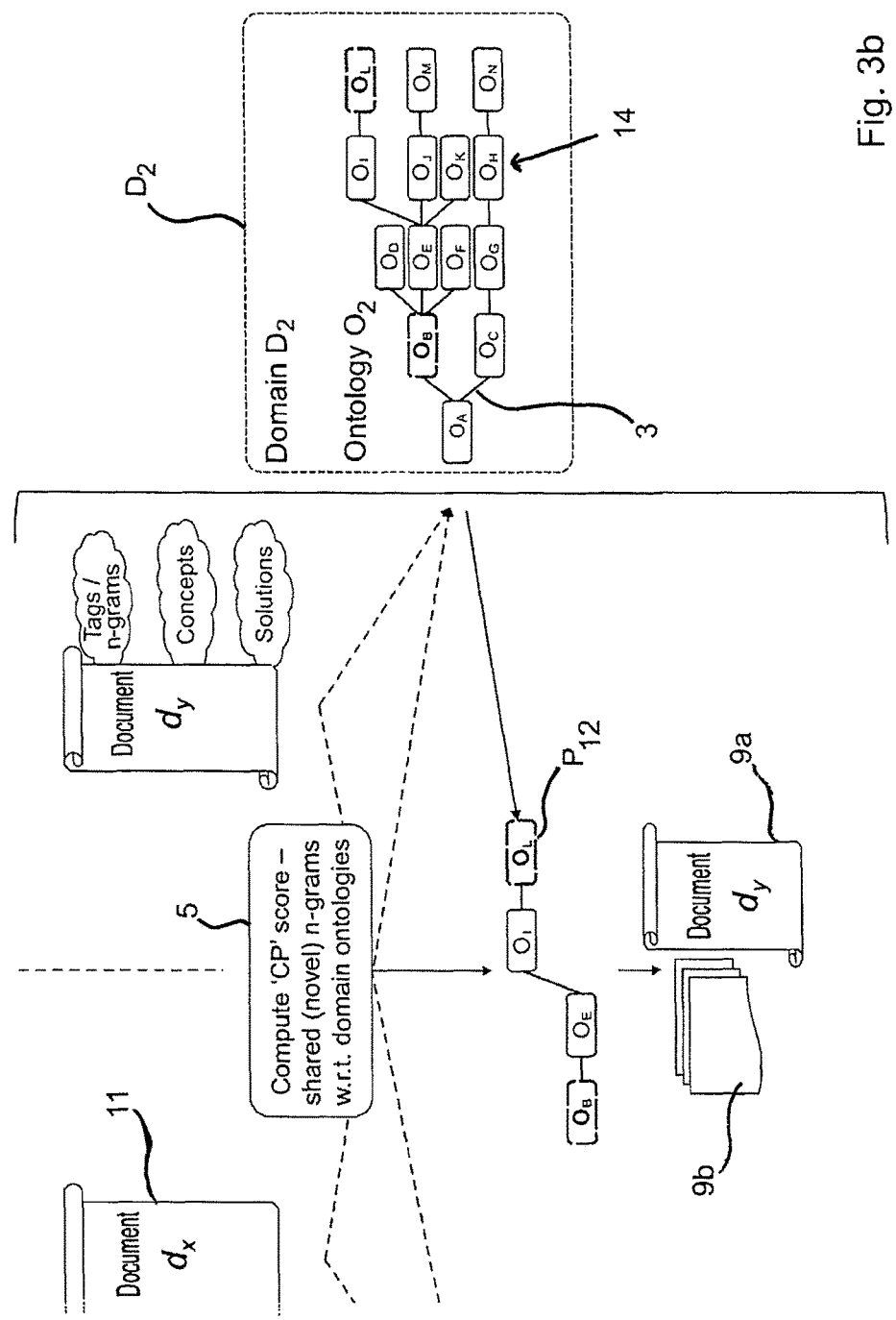

FIGS. 3a and 3b together constitute a single figure, and some of the features shown in FIG. 3a are shown again in FIG. 3b for clarity. FIGS. 3a and 3b illustrate this second technique in which the system can identify a third document ($d_z$), or list of documents, which is likely to disclose a process/workflow which could be used to merge the processes/workflows which are described in documents $d_x$ and $d_y$. In the second technique the system considers the composite proximity score ('CP'). Preferably this second technique is used only when the composite proximity score ('CP') is high; or most preferably when the composite proximity score ('CP') is above a predefined threshold CP value. FIGS. 3a and 3b have many of the same features as is shown in FIGS. 1a and 1b and like features are awarded the same reference numbers.

If, in this example, we assume that documents $d_x$ and $d_y$ contain more of the words mentioned in the list of the second ontology $O_2$, than the words mentioned in the list of the first ontology $O_1$, i.e. $P_{O2}(d_x, d_y) > P_{O1}(d_x, d_y)$ (this means that documents $d_x$ and $d_y$ share a higher overlap with ontology $O_2$ than with ontology $O_1$). For any two words (in this particular example words $O_B$, $O_L$) mentioned in the list of the second ontology $O_2$, and which are disclosed in documents $d_x$ and $d_y$, the shortest path $p_{12}$ in ontology $O_2$ connecting the two words ($O_B$, $O_L$) is identified. The system then identifies, the words which are in the path $p_{12}$ between the two words ($O_B$, $O_L$). Finally, the system identifies, from one or more databases of documents, a third document ($d_z$) 9a or group documents 9b which also discloses these words which are in the path $p_{12}$ between the two words $O_B$, $O_L$).

It will be understood that the process of identifying a path $p_{12}$ and subsequently identifying a third document ($d_z$) or group of documents which also discloses words which are in the path $p_{12}$ between the two words ($O_B$, $O_L$) may be repeated for different pairs of words ($O_B$, $O_L$) which are mentioned in the list of the second ontology $O_2$, and which are disclosed in documents $d_x$ and $d_y$.

It should be understood that a similar technique is followed when documents $d_x$ and $d_y$ contain more of the words mentioned in the list of the first ontology $O_1$, than the words mentioned in the list of the second ontology $O_2$; but in this case a path containing two words in the first ontology $O_1$ is determined; and the system identifies, from one or more databases of documents, a third document ($d_z$) or group documents which also discloses the words which are in that path.

In another embodiment the system can identify, and subsequently recommend, another domain in which there is a high likelihood of finding a document which discloses a process/workflow which could be used to merge the processes/workflows which are described in documents $d_x$ and $d_y$. Preferably the system will only identify, and subsequently recommend, another domain when the composite proximity score ('CP') and/or composite impact score ('CI') is below a predefined minimum threshold. A low score will indicate that the processes/workflows are not suitable for directly merging (at least, not in the context of their original domains $D_1$ and $D_2$). In this case the system will identify and subsequently recommend a third domain ($D_3$).

The underlying logic is that while it might not be viable to merge documents $d_x$ and $d_y$ with respect to their original domains $D_1/D_2$, a 3rd domain ($D_3$) might provide a process/workflow which can be used to link, in a unique manner, the processes/workflows which are disclosed in documents $d_x$ and $d_y$.

Figure 4A:
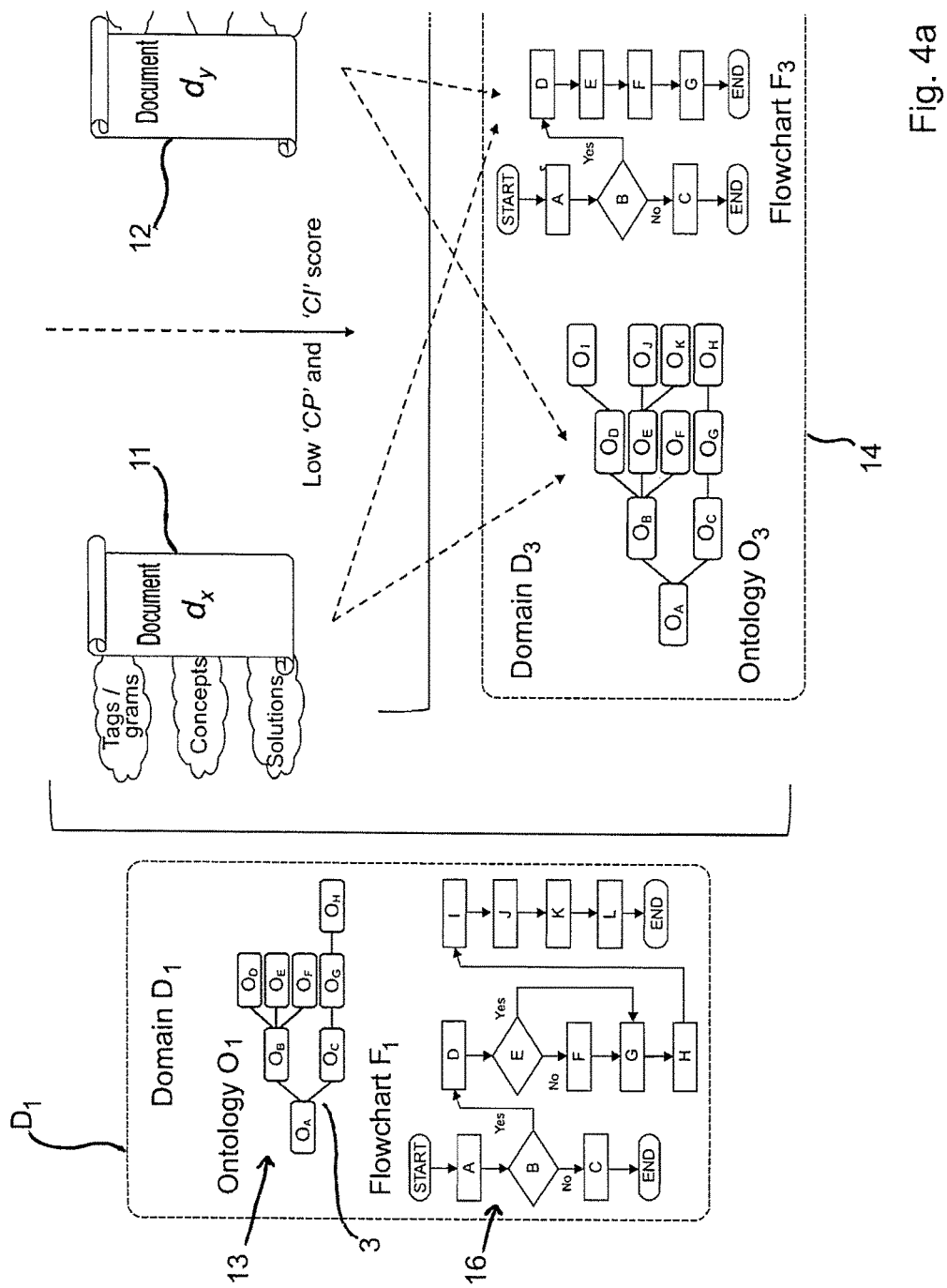
FIGS. 4a and 4b constitute a single figure which provides an illustration of variables used to identify a domain ($D_3$) to recommend as being likely to contain a document which discloses a process/workflow which could facilitate the merging of the processes/workflows disclosed in the two documents ($d_x/d_y$) under analysis, or could facilitate the integration of the process/workflow disclosed in the two documents ($d_x$, $d_y$) into a flowchart which represents known processes/workflows in a domain.
Figure 4B:
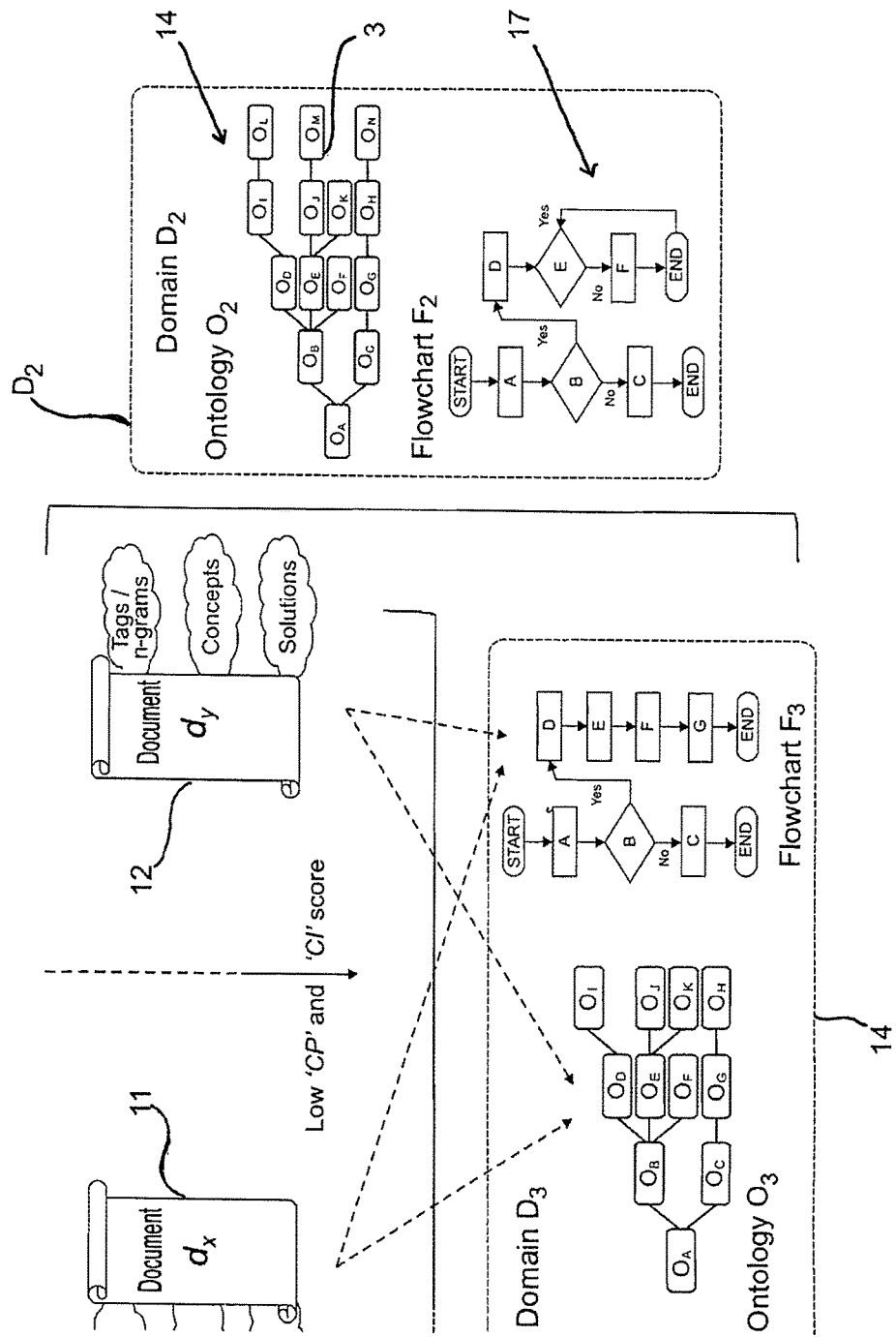

The manner in which the system identifies a third domain ($D_3$) for recommending is illustrated in FIGS. 4a and b. FIGS. 4a and 4b together constitute a single figure, and some of the features shown in FIG. 4a are shown again in FIG. 4b for clarity. FIGS. 4a and 4b have many of the same features as is shown in FIGS. 1a and b and FIGS. 3a and b, and like features are awarded the same reference numbers. In this embodiment the system will comprise a library of predefined domains ($D_1$-$D_n$), with corresponding ontologies ($O_1$-$O_n$) and flowcharts ($F_1$-$F_n$). If the system determines that the composite proximity score ('CP') and/or composite impact score ('CI') is below a respective predefined minimum CP threshold or predefined minimum CI threshold, the system will search the library to identify a ontology $O_3$ which has the highest overlap with the first and second ontologies ($O_1$, $O_2$) (i.e. to identify the ontology $O_3$ which has the most words in common with the list of words in the first and second ontologies ($O_1$, $O_2$)), and/or, will search the library to identify a flowchart ($F_3$) which has the most number of steps (i.e. nodes) which can be replaced, optimized, or improved, by processes/workflows which are described in document $d_x$ or $d_y$. Effectively the system identifies an ontology ($O_3$) and flowchart ($F_3$) in which $d_x$ and $d_y$ lead to a high 'CP', 'CI' score with respect to ontology ($O_3$) or flowchart ($F_3$). The system will then identify the domain ($D_3$) 14 in which the identified ontology ($O_3$) and flowchart ($F_3$) is. The identified domain ($D_3$) will subsequently be recommended as being a domain in which there is a high likelihood of finding a document which discloses a process/workflow which could be used to link, in a unique manner, the processes/workflows which are disclosed in documents $d_x$ and $d_y$.

It should be noted that the above embodiment is described with respect to two documents $d_x$ and $d_y$ which come from respective first and second domains $D_1$ and $D_2$. As mentioned the present invention can be applied to any number of documents from any number of domains. In the most preferable embodiment the system will monitor a plurality of different domains $D_1, D_2, \ldots, D_n$; streams of documents within each of the plurality of domains are monitored. For every document in each domain an invention score ('IN') is determined (in the manner described above); and the document within each domain which has the highest invention score ('IN') is selected. It is those documents which have the highest invention score ('IN') in each domain for which the composite novelty score ('CN') composite proximity score ('CP') and/or composite impact score ('CI') is determined (i.e. it those documents which have the highest invention score ('IN') in each of their respective domains, which define documents $d_x$, $d_y$).

The scores which are determined in the present invention allow for an automatic, computer-enabled ranking of the most promising combinations of known solutions. This is important for example if there are millions of combinations of documents which are to be analysed. For example, one set of documents could correspond to all patents related to "cars" and the other set of documents correspond to all patents related to "lighting". In order to find a new lighting solution for cars, one will want to evaluate all possible combinations between each car patent with each lighting patent, hopefully in order to retrieve a new and improved method for lighting a car. There are millions of possible 1-to-1 combinations and in the prior art the only method to find a new solution is to use intuition. What the present invention now proposes is a systematic way of testing all the combinations, and determining the interest of each combination based on new scores which can be automatically determined. This is something which can't be done without a computer, and that a person without technical skill could not consider.

FIG. 5 schematically illustrates some components or functional modules of an apparatus according to one aspect of the present invention. The apparatus comprises a data collection component 100 having a database and data collection module (such as a crawler etc), a data analysis component 200 and a user tool box 500.

The apparatus may be built as a processing unit having software thereon programmed to carry out the method steps described in this specification and bring the requested functionalities. The processing unit may be a computer, a server, or other suitable processing equipment, and computer data carriers, such as an optical, magnetic or semiconductor disk or storage system, for storing software modules or components causing the processing unit to carry out the desired steps of the invention. The apparatus is further connected to external data sources, such as the Internet/Intranet 101, file servers 102, and/or database servers 103, for accessing various data sources and storing the resulting data in a database, which may then be interrogated by a data analysis engine 200 in said processing unit.

Web crawlers may be used to collate "unstructured" data from data sources (e.g. blogs, news sources, real-time social networks, HTML/XML published journals/documents) and Web Searches may be used to collect "structured" data—semantically tagged (optionally, with statistical metadata: time, volume). Crawling frequency may be defined to provide frequent updates, and allow subsequent system function to be provided in real time.

Some data sources 103 provide dedicated feeds which send data out in real-time using a well-defined structure and format (e.g. RSS). Search engine volume data can also optionally be used. Data may also be manually entered and edited by users.

Data sources 101, 102, 103 may be selected either according to their general availability, to the area of interest or with regard to the desired nature of the innovation opportunities to be generated. For example, academic publications may result in innovation opportunities which have a longer time to market, but which also have a greater probability of broader patent claims when compared to industry publications reporting on near term technologies, such as industry journals.

The data collection component 100 presents one or more documents to the data analysis component 200. The data analysis component 200 is configured to select two or more documents each of which disclose a solution to a problem. The data analysis component 200 is further configured to: determine a composite novelty score for said at least two documents, wherein the composite novelty score is a score representing likelihood that a merging of the solutions in said two or more documents will provide a novel solution; determine a composite proximity score for said at least two documents, wherein the composite proximity score is a score representing the proximity of each of said two or more documents to one or more predefined ontologies; and to determine a composite impact score for said at least two documents, wherein the composite impact score is a score representing the feasibility of combining the solutions which are disclosed in said two or more documents. The data analysis component 200 can determine these score use the methods described earlier in the description.

Based on the determined scored the data analysis component 200 can provide a recommendation (in any of the forms described earlier in the description) which can assist to generate an innovation. The recommendation is passed to the user tool box 500 where it is displayed to be viewed by the user.

It should be noted that the data analysis component 200 could be configured to carry out any one or more of the steps and calculations, which were described earlier in the description.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method comprising:
    retrieving a first set of more than two documents belonging to a first domain ($D_1$);
    retrieving a second set of more than two documents belonging to a second domain ($D_2$);
    defining one or more ontologies;
    generating all possible combinations of documents from the first set ($d_x$) with documents in said second set ($d_y$);
    determining respective composite novelty scores for said combinations of documents ($d_x$, $d_y$), wherein the composite novelty score for one of the combinations of documents ($d_x$, $d_y$) represents a likelihood that a merging of solutions in said combination of documents ($d_x$, $d_y$) will provide a novel solution, and wherein determining the composite novelty score for said combination of documents ($d_x$, $d_y$) includes:
        identifying sets of words and/or terms $c(d_x)$ and $c(d_y)$ included in the documents ($d_x$, $d_y$) which are not included in one or more other documents which belong to a same one of the first domain ($D_1$) or second domain (D2) to which the document ($d_x$, $d_y$) belongs; and
        determining the composite novelty score based on a number of words and/or terms which are common to the sets of words and/or terms for the documents ($|c(d_x) \cap c(d_y)|$);
    determining composite proximity scores for said combinations of documents ($d_x$, $d_y$), wherein the composite proximity score for one of the combinations of documents ($d_x$, $d_y$) represents a proximity of each of said documents to the one or more defined ontologies;
    determining composite impact scores for said combinations of documents ($d_x$, $d_y$), wherein the composite impact score for one of the combinations of documents ($d_x$, $d_y$) represents a feasibility of combining the solutions in said two or more documents; and
    selecting one or more of the combinations of documents ($d_x$, $d_y$) based on the composite novelty scores, the composite proximity scores, and the composite impact scores, and providing a recommendation related to generating an innovation based on the selected one or more of the combinations of documents, wherein providing the recommendation includes presenting a solution template $S_{xy}$ in which the respective solutions in the selected combination of documents are merged to provide a new solution which differs from the respective solutions in the selected combination of documents.

2. A method according to claim 1, further comprising:
forming the solution template $S_{xy}$, wherein forming the solution template $S_{xy}$ includes replacing parts of known solutions in a domain with the solutions disclosed in said selected one or more combination of documents when the determined composite impact score for the selected one or more combinations of documents is above a predefined maximum threshold value to provide an integrated solution; and wherein providing the recommendation includes presenting said integrated solution.

3. A method according to claim 1 further comprising:
for each of said combinations of documents $(d_x, d_y)$, identifying another document $(d_z)$, which differs from said $(d_x)$ and $(d_y)$, and which includes at least a threshold number of the words and/or terms listed in the common sets of words and/or terms $(c(d_x) \cap c(d_y))$ for said documents $(d_x)$ and $(d_y)$
wherein providing the recommendation further includes presenting said identified document $(d_z)$ for at least one of the selected one or more combinations of documents.

4. A method according to claim 1, wherein defining the one or more ontologies includes:
identifying ones of the domains to which said two or more documents belong; and
for each of the domains identified, selecting keywords and/or concepts from a set of documents in that domain to define a respective ontology corresponding to that domain.

5. A method according to claim 4, further comprising:
identifying a pair of keywords and/or concepts from one of the ontologies which are also disclosed in each of said documents;
identifying a path in said one of the ontologies which links said pair of keywords and/or concepts; and
identifying another document $(d_z)$, which differs from said documents, and which includes at least a threshold number of the keywords and/or concepts which are included along said identified path;
wherein providing the recommendation further includes presenting said identified document $(d_z)$ for at least one of the selected one or more combinations of documents.

6. A method according to claim 1, wherein providing the recommendation further includes:
recommending one or more domains which are likely to contain solutions which are usable to merge the solutions disclosed in said selected one or more combinations of documents when at least one of the determined composite proximity score or the determined composite impact score for the selected one or more combinations of documents are below respective minimum threshold values.

7. A method according to claim 6,
wherein defining the one or more ontologies includes:
identifying the domains to which said two or more documents belong; and
for each of the domains identified, selecting keywords and/or concepts from a set of documents in that domain to define an ontology corresponding to that domain; and
wherein the method further includes:
identifying another ontology, from a predefined library of ontologies which correspond to domains which are different to the domains to which the two or more documents belong, the other ontology including at least a threshold number of keywords and/or concepts in common with the identifies one or more ontologies; and
wherein providing the recommendation further includes presenting one of the domains to which said two or more documents belong which corresponds to the identified other ontology.

8. A method according to claim 6, further comprising:
identifying another flowchart, from a predefined library of flowcharts which represent known solutions from a plurality of domains which are different from the domains to which the two or more documents belong, the other flowchart including at least a threshold number of steps which can be replaced by the solutions in said two or more documents;
wherein providing the recommendation further includes presenting one of the plurality of domains which corresponds to the identified flowchart.

9. A method according to claim 1, wherein defining the one or more ontologies includes:
identifying the domains to which said two or more documents belong;
for each domain identified, selecting keywords and/or concepts from a set of documents in that domain, which define an ontology corresponding to that domain.

10. A method according to claim 9, further comprising:
applying weights to each of said selected keywords and/or concepts; and
defining the ontology corresponding to a domain based on the weights.

11. A method according to claim 1, further comprising:
creating one or more flowcharts which represent known solutions in said domains to which said two or more documents belong.

12. A method according to claim 11 wherein creating the one or more flowcharts includes:
identifying the domains to which said two or more documents belong;
for each domain identified, creating one or more flowcharts which represent solutions which are disclosed in a set of documents in that domain.

13. A method according to claim 12, wherein creating the one or more includes:
creating a plurality of flowcharts, each of which represents a solution disclosed in a corresponding document in the set of documents; or
creating a single flowchart which represents an aggregation of the solutions disclosed in the set of documents.

14. A method comprising:
retrieving a first set of more than two documents belonging to a first domain $(D_1)$;
retrieving a second set of more than two documents belonging to a second domain $(D_2)$;
selecting all possible combinations of documents from the first set $(D_1)$ with all documents in said second set $(D_2)$;
determining a composite novelty score for each of said combinations of documents $(d_x, d_y)$, wherein each of the composite novelty scores represents a likelihood that a merging of the solutions in two or more of the documents ($d_x, d_y$) will provide a novel solution;

defining one or more ontologies for the first and second domains;

determining a composite proximity score for each of said combination of documents ($d_x, d_y$), wherein each of the composite proximity scores represents a proximity of each of said two or more documents to the one or more ontologies;

determining a composite impact score for each of said combinations of documents, wherein each of the composite impact scores represents a feasibility of combining the solutions in said two or more documents;

presenting at least one said combination of documents based on at least one of the determined composite novelty score, the composite proximity score, or the composite impact score; and providing a recommendation related to generating an innovation based on the selected one or more of the combinations of documents, wherein presenting the at least one of said combination of documents includes presenting a solution template $S_{xy}$ in which the at least one of said combination of documents are merged to provide a new solution which differs from the respective solutions in the at least one of said combination of documents.

15. A method comprising:

retrieving a first set of more than two documents belonging to a first domain ($D_1$);

retrieving a second set of more than two documents belonging to a second domain ($D_2$);

selecting all possible combinations of documents from the first set with all documents in said second set;

defining one or more ontologies;

determining a composite novelty score for each of said combination of documents, wherein each of the composite novelty scores represents a likelihood that a merging of solutions in corresponding two or more documents will provide a novel solution;

determining a composite proximity score for each of said combinations of documents, wherein each of the composite proximity scores represents a proximity of each of said documents to the one or more ontologies, wherein for each of said documents, the number of keywords and/or concepts ($P_{O1}(d_x)$, $P_{O2}(d_x)$, $P_{O1}(d_y)$, $P_{O2}(d_y)$) mentioned in each ontology and which are mentioned in that document are determined and the number of keywords and/or concepts determined for each of said two or more documents in one of the combinations are added to determine the corresponding composite proximity score for that combination of documents;

determining a composite impact score for each of said combinations of documents, wherein each of the composite impact scores represents a feasibility of combining the solutions which are disclosed in said two or more documents; and based on the determined composite novelty scores, the determined composite proximity scores, and the determined composite impact scores, providing a recommendation related to generating an innovation, wherein providing the recommendation includes presenting a solution template $S_{xy}$ in which respective solutions in a selected combination of documents are merged to provide a new solution which differs from the respective solutions in the selected combination of documents.

16. A method comprising:

retrieving a first set of more than two documents belonging to a first domain ($D_1$);

retrieving a second set of more than two documents belonging to a second domain ($D_2$);

selecting all possible combinations of documents from the first set with all documents in said second set;

defining one or more ontologies;

determining a composite novelty score for each of said combination of documents, wherein each of the composite novelty scores represents a likelihood that merging solutions two or more documents in a corresponding combination will provide a novel solution;

determining a composite proximity score for each of said combination of documents, wherein each of the composite proximity scores represents a proximity of each of said documents to the one or more ontologies;

determining a composite impact score for each of said combination of documents, wherein each of the composite impact scores represents a feasibility of combining the solutions which are disclosed in said two or more documents, wherein the composite impact score is determined using the formula:

$$CI_{F1,F2,\ldots,Fn}(d_1, d_2, \ldots, d_n) = \max[(|F_{11}| + |F_{12}| + \ldots + |F_{1n}| - |F_{11} \cap F_{12} \cap \ldots \cap F_{1n}|)/|F_1|, (|F_{12}| + |F_{22}| + \ldots + |F_{2n}| - |F_{12} \cap F_{22} \cap \ldots \cap F_{2n}|)/|F_2|, (|F_{1n}| + |F_{n2}| + \ldots + |F_{nn}| - |F_{1n} \cap F_{2n} \cap \ldots \cap F_{nn}|)/|F_n|],$$

wherein $|F_{11}|$ is the number of steps (i.e. number of nodes) in flowchart $F_1$, which can be, optimized, or improved, by processes/workflows which are described in document $d_1$; $|F_{12}|$ is the number of steps (i.e. number of nodes) in flowchart $F_1$, which can be, optimized, or improved, by processes/workflows which are described in document $d_2$; $|F_{1n}|$ is the number of steps (i.e. number of nodes) in flowchart $F_1$, which can be, optimized, or improved, by processes/workflows which are described in the 'n'th document $d_n$; $|F_{21}|$ is the number of steps (i.e. number of nodes) in flowchart $F_2$, which can be, optimized, or improved, by processes/workflows which are described in document $d_1$; $|F_{22}|$ is the number of steps (i.e. number of nodes) in flowchart $F_2$, which can be, optimized, or improved, by processes/workflows which are described in document $d_2$; $|F_{2n}|$ is the number of steps (i.e. number of nodes) in flowchart $F_2$, which can be, optimized, or improved, by processes/workflows which are described in the 'n'th document $d_n$; $|F_{n1}|$ is the number of steps (i.e. number of nodes) in the 'n'th flowchart $F_n$, which can be, optimized, or improved, by processes/workflows which are described in document $d_1$; $|F_{n2}|$ is the number of steps (i.e. number of nodes) in the 'n'th flowchart $F_n$, which can be, optimized, or improved, by processes/workflows which are described in document $d_2$; $|F_{nn}|$ is the number of steps (i.e. number of nodes) in the 'n'th flowchart $F_n$, which can be, optimized, or improved, by processes/workflows which are described in the 'n'th document $d_n$; $|F_{11} \cap F_{12} \cap \ldots \cap F_{1n}|$ is the number of overlapping steps (i.e. number of nodes) in flowchart $F_1$, which can be, optimized, or improved, by processes/workflows which are described in documents ($d_1, d_2, \ldots, d_n$); $|F_{21} \cap F_{22} \cap \ldots \cap F_{2n}|$ is the number of overlapping steps (i.e. number of nodes) in flowchart $F_2$, which can be, optimized, or improved, by processes/workflows which are described in documents ($d_1, d_2, \ldots, d_n$); $|F_{n1} \cap F_{n2} \cap \ldots \cap F_{nn}|$ is the number of overlapping steps (i.e. number of nodes) in the 'n'th flowchart $F_n$, which can be, optimized, or improved, by processes/workflows which are described in documents ($d_1, d_2, \ldots, d_n$); $|F_1|$ is the number of steps (i.e. nodes) in flowchart $F_1$; $|F_2|$ is the number of steps (i.e. nodes) in flowchart $F_2$; $|F_n|$ is the number of steps (i.e. nodes) in the 'n'th flowchart $F_n$;

creating one or more flowcharts which represent known solutions in said domains to which said two or more documents belong; and based on the determined composite novelty scores, the determined composite proximity scores, and the determined composite impact scores, providing a recommendation related to generating an innovation, wherein providing the recommendation includes presenting a solution template $S_{xy}$ in which respective solutions in a selected combination of documents are merged to provide a new solution which differs from the respective solutions in the selected combination of documents.

17. A method comprising:

retrieving a first set of more than two documents belonging to a first domain ($D_1$);

retrieving a second set of more than two documents belonging to a second domain ($D_2$);

selecting all possible combinations of documents from the first set with all documents in said second set:

determining a composite novelty score for each of said combination of documents, wherein each of the composite novelty score scores represents a likelihood that a merging of solutions in two or more documents in a corresponding combination will provide a novel solution;

determining a composite proximity score for each of said combination of documents, wherein each of the composite proximity scores represents a proximity of each of said documents to the one or more ontologies;

determining a composite impact score for each of said combination of documents, wherein each of the composite impact scores represent a feasibility of combining the solutions which are disclosed in said two or more documents; and based on the determined composite novelty scores, the determined composite proximity scores, and the determined impact scores, providing a recommendation which can assist related to generating an innovation, wherein providing the recommendation includes presenting a solution template $S_{xy}$ in which respective solutions in a selected combination of documents are merged to provide a new solution which differs from the respective solutions in the selected combination of documents, and wherein providing said recommendation further includes at least one of:

providing a first recommendation to merge the solutions disclosed in said two or more documents in the selected combination into a solution which represents known solutions in a domain, if the determined composite impact score for the selected combination is above a predefined maximum threshold value;

providing a second recommendation of one or more other documents, each of which disclose a solution which is compatible for integration with the solution disclosed in at least one of said two or more documents in the selected combination, if the determined composite impact score for the selected combination is within a predefined range;

recommending one or more domains which are likely to contain solutions which are usable to merge the solutions disclosed in said two or more documents in the selected combination, if at least one of the determined composite proximity score or the determined composite impact score for the selected combination is below a predefined minimum threshold value.

* * * * *